United States Patent [19]

Ripatonda

[11] Patent Number: 4,945,826
[45] Date of Patent: Aug. 7, 1990

[54] PERFECTED MACHINE FOR PREPARING A PORTION OF FRIED FOOD AND FOR IMMEDIATELY DISTRIBUTING OF THIS PORTION

[76] Inventor: Gilberto Ripatonda, Via Quasimodo 3/A, Suzzara Mantova, Italy

[21] Appl. No.: 329,347

[22] Filed: Mar. 27, 1989

[30] Foreign Application Priority Data

May 31, 1988 [IT] Italy .................................. 3486 A/88

[51] Int. Cl.[5] ............................................. A47J 37/12
[52] U.S. Cl. ........................................ 99/357; 99/352; 99/403; 99/407
[58] Field of Search ................. 99/352, 336, 353, 338, 99/355, 357, 403, 404, 407, 408, 409, 410, 417; 210/DIG. 8

[56] References Cited

U.S. PATENT DOCUMENTS

| | | | |
|---|---|---|---|
| 3,430,553 | 3/1969 | Di Pietro | 99/408 X |
| 3,448,677 | 6/1969 | Dexters | 99/407 |
| 3,667,373 | 6/1972 | Sicher et al. | 99/407 |
| 3,762,394 | 10/1973 | Newcomer | 99/330 |
| 3,793,813 | 2/1974 | McAllister | 99/408 X |
| 4,489,646 | 12/1984 | Schmidt et al. | 99/336 |

*Primary Examiner*—Timothy F. Simone
*Attorney, Agent, or Firm*—Stevens, Davis, Miller & Mosher

[57] ABSTRACT

The unit comprises a deep pan located within a casing, closed at the top by a cover that features a first window, facing a raw food magazine, and a second window, closed by a door turning upwards and facing a station accessible from outside in which a container is placed from a dispenser located above; a drainer is located between the deep pan and the cover and can rotate so that after receiving the raw food through the first window it empties the fried food into the container through the second window. The deep pan contains a mixture of oils that is kept at a preset level by a feeder and heated by an electrical heating element, while the fumes given off by the oils and frying food are conveyed to a purifier that discharges outside purified fumes with low temperature and humidity.

10 Claims, 3 Drawing Sheets

PERFECTED MACHINE FOR PREPARING A PORTION OF FRIED FOOD AND FOR IMMEDIATELY DISTRIBUTING OF THIS PORTION

BACKGROUND OF THE INVENTION

The invention relates to a machine for preparing a portion of fried food and for immediately distributing of this portion.

DESCRIPTION OF THE PRIOR ART

The Applicant filed Italian Patent Application No. 4736B/87 and No. 4909B/87 corresponding to U.S. Ser. No. 101.147 filed on Sept. 25th, 1987, for the purpose to protect a perfected unit for the preparation of a portion of fried food, and for the immediate distribution of this food.

The unit features a metal inner casing, solidly located within a housing and fitted with a window closed by a door that opens towards the outside of the inner casing.

A deep pan and drainer are located inside the inner casing. The deep pan contains a mixture of oils heated by an electrical heating element while the drainer is made to move around a horizontal axis from a filling position, in which it is immersed in the mixture of oils, to an emptying position in which the drainer strikes against the door so that the door swings upwards enabling the portion of fried food to be emptied into a container that is already located in a station that is accessible from outside the unit.

Guiding means convey a portion of raw food towards the drainer, when the drainer is located in the filling position.

A raw food magazine is located above the inner casing and inside the housing from which a portion of raw food comes by means of the action of gravity with a present weight and is conveyed towards the guiding means.

The inside of the inner casing is kept under the action of a depression in relation to the outside atmosphere in order to avoid the greasy fumes given off by the heated oil mixture from spreading to the inside of the housing.

All this is aimed to limit the soiling of the inner surfaces of the housing and the means located inside the housing by the greasy fumes, on one hand, and to avoid the spreading of the greasy fumes to the outside atmosphere.

The afore mentioned greasy fumes tend to go upwards, because they are hot (warm) so that, in spite of the depression existing inside the casing, they come into contact with the raw food magazine. As a result the properties of the food are spoiled by the same fumes.

Furthermore the afore mentioned guiding means like other means connecting the guiding means to the raw food magazine and the magazine itself become increasingly soiled with the greasy fumes, obliging those running the unit to put it out of use after a short period of operation, in order to enable the necessary cleaning operations to be carried out, with all the disadvantages and expense involved.

The quantity of the oil mixture into the deep-pan depends on the capacity of the deep pan; the evaporation of the mixture, that causes the greasy fumes to be given off, also causes the lowering of the mixture level.

The lowering of the mixture level under a minimum value, makes it necessary to stop the unit, to open the inner casing and to top up the mixture in the deep-pan or to replace it completely.

The need for the mixture to be added or replaced unfavourably affects both in the productivity of the unit and in the running expense of the unit.

The inside of the inner casing is kept under the action of a depression by an aspirator located in a duct leading on one side to the inside of the casing and on the other side to the inlet of a purifier that is made as disclosed in the Patent Applications stated here in above.

The purifier consists of a counter current heat exchanger which has inside it an electric heating element the temperature of which is such as to cause the complete combustion of the greasy fumes. The above mentioned allows the greasy fumes to be eliminated from the gas that is spread to the outside atmosphere.

The temperature of the gas is higher than the average environment temperature of the places where the housing is located.

When food abounding in wetness is fried, a great amount of steam is given off and intermittentely (that is to say each time a portion of food is fried) is spread out to the outside atmosphere, together with the flow of purified gas.

The great quantity of steam can give rise to local and undesirable condensations of the steam itself with all the drawbacks that result therefrom.

The unit just described above, is provided with an automatic container feeder.

The Applicant filed an Italian Patent Application under the number 5058B/85 that corresponds to the U.S. Pat. No. 4,770,588.

The Application and Patent disclose an automatic machine for selling fried food that constitutes the subject of that invention.

The said feeder makes it easier to separate the lowest container of a pile of containers from the pile itself.

In the feeder a pair of counter positioned controls are foreseen, these controls being designed for guiding and containment of the pile of containers.

Each control comprises an angular contour and maintained an adjustable distance with respect to the other.

Under normal conditions the lowermost container of the pile rests onto two thin plates connected to a trolley and positioned at both sides in respect of the container pile, in such a way as to support corresponding portions of the border of this lowermost container.

Two thin sheets are fastened jointly to the trolley and are disposed in position aligned in respect of the plates, at a level that is slightly higher in respect of the level of the plates themselves.

Moreover two booms, each one composed of two segments, are hinged at their intermediate points to the trolley in position aligned in respect of the plates. The fore segment of each boom, that is the segment turned toward the corresponding thin sheet, is located under a related plate.

The rear segment of each boom is longer than the fore segment so that the force segment is kept against the above sheet, when no force acts on the boom.

The forward stroke of the trolley brings about the disengagement of the plates with the border of the lowermost container of the pile, and the insertion of the fore segments with the related thin sheets, arranged in a package, between the border of the lowermost container and the border of the container immediately overlying the lowermost container.

During this stage each fore segment and the related thin sheet, are joined together.

A tooth, provided in proximity of the free end of each rear segment, strikes against a fixed control before the end of the forward stroke of the trolley; thus causing the fore segments to rotate downwards so that the lowermost container of the pile is separated from the pile itself, the remainder of the pile resting on the couple of thin sheets.

The lowermost container is expelled toward the base where other components will position the container for the reception of the fried food.

The trolley initiates its return stroke, with conseguent disengagement of the thin sheets with the border of the new container that occupies the lowermost position of the pile. At the same time the plates engage with the border of the now lowest container in the pile.

The just described container feeder foresees the joining of the fore segments of the booms with the related thin sheets caused by the weight of the rear segments and this does not always assure a good working of the feeder.

SUMMARY OF THE INVENTION

An object of the present invention is to provide a unit for preparing and immediately selling a portion of fried food which is made in such a way as to avoid the row food in the magazine to be spoiled by the greasy fumes, which discharges these fumes to the outside with a temperature and humidity percentage that are as low as to be tolerable for any closed environment, and which is reliable in operating as far as the separation of the lowermost container of a pile from the pile itself is concerned.

For this purposes the machine herein disclosed according to this invention, comprises a housing supporting within it: a deep-pan containing a mixture of oils; a heat source connected to the deep-pan for keeping said oil mixture at a preset temperature; a mesh drainer having a net-part and a solid part, opposite to the net-part, said drainer, being made able to rotate in relation to a horizontal axis from a filling position, in which its net-part is immersed in the mixture, to an emptying position, in which its solid part, that is shaped in such a way as to convey fried food, is turned downwards and placed over a delivering station, that is in turn accessible from outside; a magazine of raw food; means for delivering a preset portion of raw food from said raw food magazine; guiding means working in conjunction with the delivering means and raw food magazine in order to convey the preset raw food portion to the deep-pan; a container feeder supplied with a pile of containers having the lowermost container located over the delivering station, said feeder having the task of separating the lowermost container from the pile and dropping the separated container into the delivering station; means for conveying greasy fumes coming from the heated oil mixture to a purifier that has the task of eliminating them; an electric-electronic control unit for controlling the heat source, the rotational movement of the drainer, the delivering means, the container feeder, the means for conveying the greasy fumes to the purifier, and the purifier; a cover fitted to the deep-pan in such a way so that it is able to be removed therefrom, that features in one side a first vertical window to which an exit of the guiding means is adjoined in order to convey therein a preset portion of raw food dropping from the magazine beneath which the guiding means are located, and a second window in another side adjoining the delivering station and closed by a door the upper edge of which is hinged to the cover so that it is able to turn outwards and upwards, the second window being featured in order to allow the solid part of the drainer to go through it with consequent rising of the door, with a space delimited by said cover being connected to the purifier by means of a duct that is kept under the action of a depression by aspirating means; means for feeding the oil mixture located outside said deep-pan, and having the task of keeping the oil mixture at a constant preset level.

The purifier comprises: a first countercurrent heat exchanger receiving a first air flow containing the greasy fumes through the conveying means and according to a preset depression caused by aspirating means, the heat exchanger being provided in its core with an electrical heating element that is fed and controlled by the control unit and having the task of burning the greasy fumes; a second heat exchanger placed in series with the first one and having the task of provoking the partial condensation of steam, generated during a food frying and present in the first air flow, the second heat exchanger being made in such a way as to cause the evaporation of water condensed from the steam during at least a period of time comprised between two consecutive fryings; a cap, within which the first heat exchanger is located, said cap in conjunction with the first heat exchanger delimiting a hollow space connected to an exit of the second heat exchanger; further aspirating means for sending a second air flow coming from outside into the hollow space, through a first opening featured in the cap, in order to cool the outer surface of the first exchanger and to obtain a third air flow by mixing the second flow coming from outside with a fourth air flow coming from the second heat exchanger, the third air flow being discharged to the outside through a second opening featured in the cap.

The container feeder comprises: a fixed rectangular frame with two control arms respectively fixed to two opposite transverse sides of it and provided with brackets respectively fastened to opposed free ends of them for positioning and laterally containing said pile; means for adjusting the distance between the brackets, as well as for adjusting the position of them in respect of the longitudinal axis of the frame; a trolley having two longitudinal sheets received in support and guided by longitudinal bars forming the frame; means controlled by the control unit and designed for longitudinally moving the trolley according to a forward stroke and a return stroke; two plates fitted to the related sheets and designed to receive in support corresponding parts of the border of the lowermost container of the pile when the trolley is placed in an idle position; two longitudinal bands fastened to the trolley, each band being located downstream of a related plate, with respect to said forward stroke of said trolley, and at an upper level in respect of the related plate in order to receive in support a corresponding portion of the border of the penultimate container of the pile just before the disengagement of the lowermost container from the related sheets that occurs in the forward stroke of the trolley; two elastic strips centrally jointed to the trolley and having related rear ends fastened to the same with an end segment of each strip located downstream of a corresponding plate, in respect of the forward stroke of the trolley, the end segment being positioned beneath and resiliently kept in contact with a corresponding band as a result of the articulated joint connecting a central segment of the strip to the trolley; fixed stopping means designed to be struck by a rear segment of the strip, as a consequence of the forward stroke of the trolley and after the plates have disengaged from related portions of the border of the lowermost container of the pile, thus causing the end segments to turn downwards and the lowermost container to part from the pile.

BRIEF DESCRIPTION OF THE DRAWINGS

While the specification concludes with claims which particularly point out and distinctly claim the subject matter forming the present invention, it is believed that the invention will be better understood from the following description, taken in conjunction with the accompanying drawings in which:

DESCRIPTION OF THE PREFERRED EMBODIMENT

With reference to the said figures, 1 indicates a housing, one vertical panel 2 of which is hinged so that it is able to turn in relation to a vertical axis, thus enabling one to gain access to the inside of the housing.

The housing 1 contains an assembly 10 having the task of frying a portion of raw food, a magazine 20 for raw food, a container feeder 30 which feeds containers 31 to a delivering station S where the fried food is poured into said containers, a purifier 40 and an electric-electronic control unit 50 for controlling the unit.

The access to the delivering station S is allowed through a doorway 4 made in the vertical panel 2 and closed by means of a door 5 movable upwardly in such a way as to open and close the doorway.

The assembly 10 comprises a deep-pan 6, resting on brackets 7 fixed to the housing 1, and a cover 8 secured to the deep-pan in such a way that it can be removed therefrom.

The deep-pan 6 contains a suitable mixture of oils 9 that is kept constant at a preset level, by feeding means 11 located outside the deep-pan and connected to this latter by means of a pipe 11a.

The heating of the mixture is performed by an electric heating element 12 disposed near the bottom of the deep-pan inside this latter, and controlled by the control unit 50.

The cover 8 features two windows 8a, 8b first and second respectively, in its opposite sides. The first window 8a is connected to the out-let of a funnel-shaped tube 13 the inlet of which is located under the magazine 20.

The means generally indicated by 14 and working in conjunction with the magazine 20 in order to deliver therefrom a portion of raw food are not described in detail herein, since they are well described in the above mentioned U.S. Ser. No. 101.147.

The second window 8b is closed by means of a door 18 hinged with its upper border to the cover and located outside the same cover.

A mesh drainer 15, of the type having a part 15a made of net such as that described in the (U.S. Ser. No. 101.147), is located into the space 2 delimited by the deep-pan 6 and the cover 8.

The drainer 15 is joined to a shaft 16 that is fitted to the cover 8, in such a way that the shaft can rotate.

Figure 1:
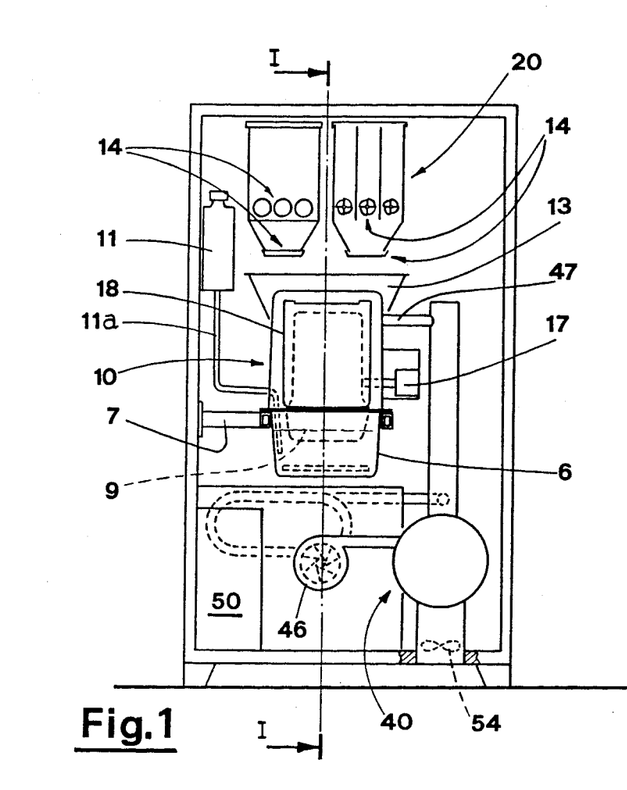
FIG. 1 is a schematic view of a vertical side cross-section of the unit.
Figure 2:
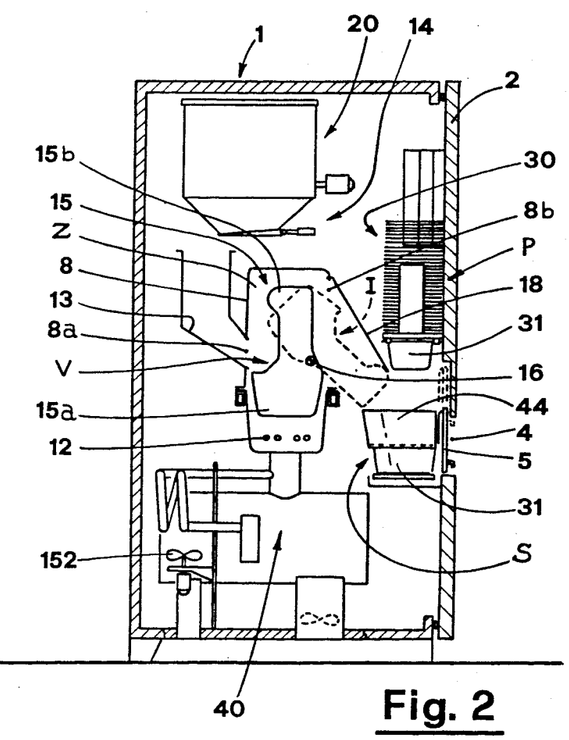
FIG. 2 shows a cross-section of the unit along the section line I—I of FIG. 1.

A motor 17, controlled by the control unit 50, turns the shaft 16 so that the drainer 15 can be swung from a vertical position V, in which the said net part 15a is immersed in the mixture into the deep-pan (this position is shown in full-line in FIG. 2), to a sloping position I (that is shown by a broken line in FIG. 2) in which the part 15 of the drainer opposite to the net-part 15a comes out through the second window 8b thus lifting up the door 18 outwards.

When the drainer is placed in the vertical position V it receives the raw food from the funnel-shaped tube 13 into its net-part 15a.

When the drainer 15 is placed in the sloping position I, the already fried food runs along the solid part 15b, that is made like a guide channel, and drops into a container 31 located in the station S.

Figure 4:
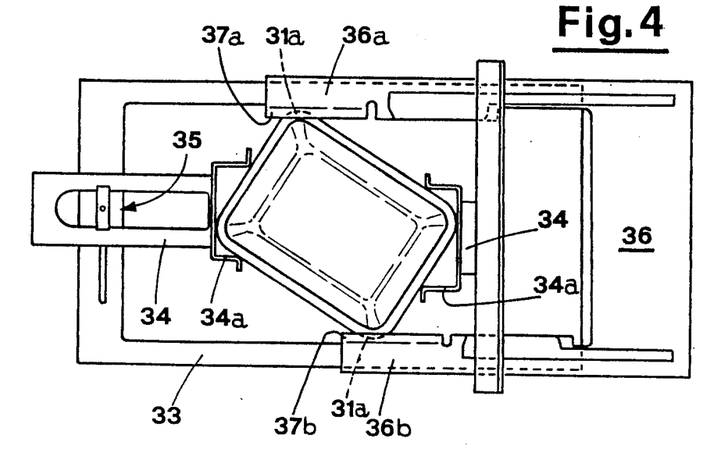
FIG. 4 is a plan view of the container feeder.
Figure 5A:
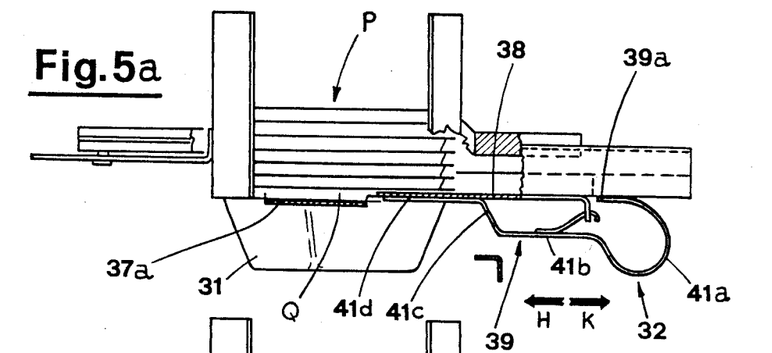
FIGS. 5a, 5b are schematic side views of the container feeder, provided with means for the separation of the lowermost container of the pile, these means being displaced in the idle position and the operative position respectively.
Figure 5B:
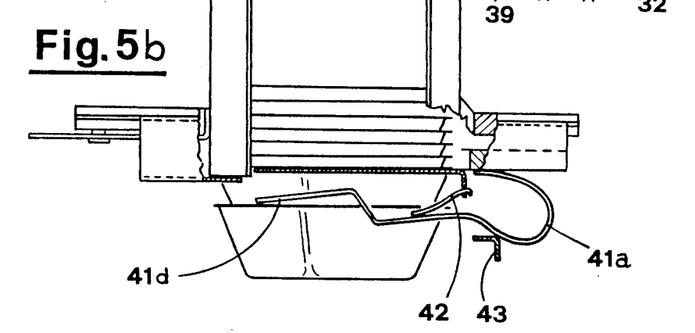

The container is parted from the bottom of the container pile P in the feeder 30 by separating means 32 (see FIGS. 4, 5a and 5b).

The feeder 30 comprises a fixed rectangular frame 33 with two control arms 34 fitted to its transverse sides.

Two "Ω" shaped brackets 34a are respectively fastened to the opposed free ends of the control arms 34.

Known means 35 allows the distance between the brackets 34a to be adjusted and the positioning of the brackets 34a to be varied in respect of the longitudinal axis of the frame 33.

The longitudinal bars forming the frame 33 receive in support and guide two related sheets 36a and 36b of a trolley 36 that is made to move longitudinally according to a forward stroke (in the direction H) followed by a return stroke (in the direction K), by means that are the same as those described in the U.S. Pat. No. 4,770,588.

In FIG. 4 the trolley 36 is down placed at an idle position.

The aforementioned sheets 36a, 36b feature two related plates 37a, 37b which, with the trolley placed in the idle position, receive in support corresponding parts of the border 31a of the lowermost container 31 of the pile P.

Separation means 32 are fastened to the trolley 36 and are located downstream of the said plates in respect of the direction K.

In the accompanying drawing the separating means associated to the plate 37a only are shown.

The aforementioned means 32 are composed of a metal band 38 longitudinally extending to a point close to the plate 37a.

The band 38 is located at a level that is slightly higher then the level of the plate 37a and slightly lower then the level of the border of the penultimate container of the pile.

The separating means also comprise a metal strip 39 having its rear end 39a bound to the trolley.

The strip is composed of: a rear segment 41a, that starts from the rear end and is bent downwards in an angle of about 270 degrees; a central segment 41b that is straight and parallel to the plate 37a and extending toward this latter; a flat segment 41c sloping upwards;

and an end straight segment 41d, extending towards the plate 37a and located beneath the band 38.

An elastic tailpiece 42 is fastened to the central segment 41b and to the band 38, so that the end segment 41d is resiliently maintained pressed against the overlying band 38.

Under this condition the assembly comprising the band 38 and the end segment 41d is aligned with the longitudinal stripe Q located between two superimposed portions of the border of the lowermost and penultimate containers of the pile.

As a consequence of the moving of the trolley 36 in direction H, the aforecited assembly gradually inserts in the stripe Q, while the plate 37a, that is connected to this assembly, moves from the position beneath the related portions of the border of the lowermost container.

The means 32 connected to plate 37b act in the same way as the means 32 connected to plate 37a i.e., in synchrony with each other.

The rear segments 41a, that are bet downwards, strike against a fixed and transverse stop 43.

The striking takes place after the plates 37a and 37b have left the position beneath the border of the lowermost container, and causes the end segments 41d of means 32 to rotate downwards, with the tailpieces 42 acting as elastic hinges.

Because of their rotation the end segment 41d push against the border of the lowermost container of the pile P thus detaching the container from the pile (see FIG. 5b).

The container drops in the underlying station S where guiding means 44 provide the correct positioning of the container.

During this stage (see FIG. 5b) the pile P rests onto the bands 38.

When the trolley 36 runs the return stroke, the bands 38 gradually disengage from the related portions of the lowermost container border, while in the meantime the plates 37a and 37b move back to a position beneath the just said portions in order to receive the pile resting on them, when the bands have completely left the portions of the border itself.

At this point the end segment 41d of each strip 39 becomes again to pushing against 38.

The separating means 32, as described herein, are extremely functional and reliable in the long run.

In fact the end segments 41d are resiliently maintained pushing against the overlying band 38 because of the particular shape of the strips 39 and because of the constraint (the tailpieces 42) by which these tailpieces are fastened to the trolley.

Furthermore the rotation downwards of the end segments 41d occurs in a jerk as a consequence of the striking of the rear segments 41a against the stop 43, the rear segments getting resiliently deformed.

After the segments 41a have disengaged from the stop 43, the elasticity of the strips 39, that was previously bent, restores the strips 39 to their normal shape.

The particular shape of the means 32 makes these strips 39 particularly resistent to the stress caused by their use.

The elements which, being assembled, constitute the above mentioned means, do not break or yield, and this gives the reliability, over the long run.

The absence of pins, pivots and/or bushes is a positive aspect both because of the low production expanses of the means and because of the reliability of these latter.

47 indicates a duct that departs from the cover 8 and leads into an annular channel 147 that is connected to the space Z.

Figure 3:
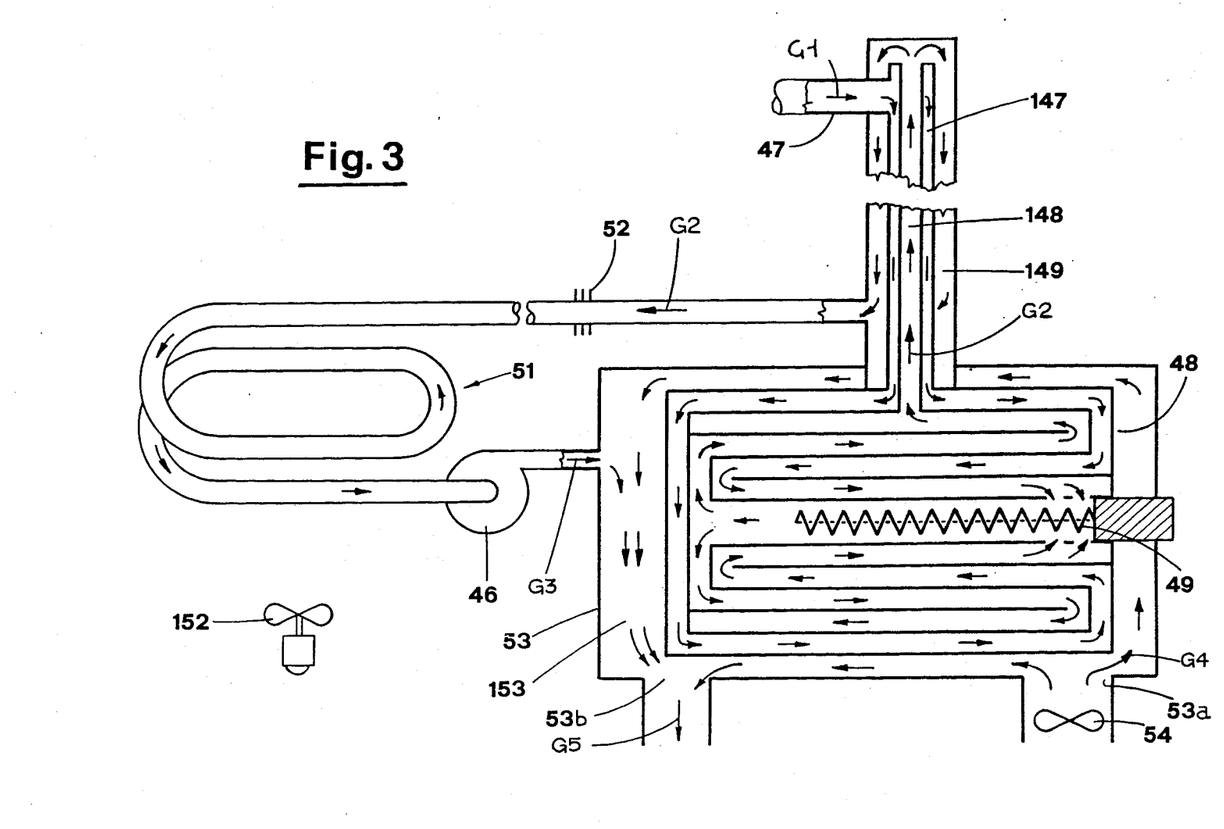
FIG. 3 shows a schematic enlargement of the fumes purifier.

The channel 147 in turn leads into a heat exchanger, of the countercurrent air-to-air type (see FIG. 3).

An electric heating element 49 is located inside the heat exchanger (see the above mentioned U.S. Ser. No. 101.147).

At the exit of the heat exchanger 48 there is a pipe 148 formed by the space inside of the anular channel 147.

The exit of the pipe 148 is connected to a hollow space 149 that encircles the outside wall of the annular channel 147 and is delimited by a cylindrical cover.

The hollow space 149 leads to a pipe coil 51 that can be provided with external finning 52; the finning is not necessary though for the proper working of the machine.

A fan 152 provides the air-cooling over the pipe coil while an aspirator 46 is set in series with the pipe coil.

The pipe coil 51 leads to a hollow space 153 delimited by the outer wall of the heat exchanger 48 and by a cap 53 that surrounds the exchanger.

The aspirator 46 keeps the heat exchanger 48, and thus the space Z, under the action of a depression.

As a consequence of this the air flow G1, that is composed of steam and greasy fumes coming out from the heated oil mixture as well as from the frying food, is sucked from the space Z and sent to the heat exchanger 48, through the duct 47 and the annular channel 147.

The greasy fumes are then completely burned while they are inside the exchanger as a consequence of the temperature of the electrical heating element 49 (like in the U.S. Ser. No. 101.147).

The flow G2, that comes out from the heat exchanger 48, without greasy fumes, is made to run through the pipe 148, the hollow space 149 and the pipe coil 51 by means of the aspirator 46.

The flow G2, while running through the pipe 148, and the hollow space 149, is superheated so that the flow G1 that runs through the annular channel 147 thus prevents the steam contained in the flow G1 from condensing.

The flow G3, that comes out from the pipe coil 52, is conveyed to the hollow space 153 to which a flow G4 is also conveyed, this latter coming in from the outside through a first opening 53a, featured in the cap 53.

A fan 54, located at the opening 53a provides the flow G4, the task of which is that of cooling the outside wall of the heat exchanger 48.

The flow G5, resulting from the mixing of the flows G3 and G4, is discharged to the outside and downwards, through a second opening 53b featured in the cap 53.

The user operates the electric-electronic control unit 50 by inserting one coin in a suitable coin box (not shown in the figures) or card into a suitable device (also not shown) so that the machine performs an operating cycle.

This brings into action the means 14 and a preset portion of raw food drops from the magazine 20 to the portion 15a of the mesh drainer 15, running through the funnel-shaped tube 13.

At the same time by the action of the feeder 30, the lowermost container 31 of the pile P is parted therefrom and drops into the station S, according to what has already been described.

After a period of time, the length of which depends on the type of the raw food, the control unit 50 brings into action the motor 17.

Because of the working of the motor 17 the drainer 15 moves from the filling position V to the emptying position I thus dropping the already fried food into the container 31 that is located in the station S.

At this point the user, after raising the door 5, draws the container 31 out from the station S, with the fried food inside it.

The aspirator 46 sucks the air flow G1, composed of greasy fumes, coming out from the heated oil mixture 9, and steam generated from the water contained in the raw food, through the heat exchanger 48.

The electrical heating element 49, located inside the heat exchanger 48 completely burns the greasy fumes.

The flow G2 getting out of the heat exchanger without greasy fumes, is conveyed through the pipe coil 51.

While the flow G2 runs through the pipe coil a part of the steam condenses and drops onto the inner wall of the pipe coil, because of the heat exchange with the outside.

As a consequence the flow G3 has little water and steam as compared to flow G2.

The flow G3 and the flow G4 taken in from the outside are mixed together inside the hollow space 153; the aim of mixing flow G3 and flow G4 is to lower the temperature of the resulting flow G5 to a value that is compatible with the temperature value of the environment, where the machine is placed.

Furthermore the humidity content of the flow G5 is so small as not to cause undesirable condensing in the environment, particularly on the floor.

The period of time between two consecutive fryings is long enough to allow all the water, previously deposited on the inner surface of the pipe coil 51, to evaporate.

In fact during such a period of time the flow G2 is practically dry and furthermore its temperature is so high that is causes the aforecited evaporation.

After all the purifier 40 discharges to the outside a flow G5 having a temperature and humidity such that they do not provoke anomalous conditions in the environment here the machine is situated.

The small amount of steam in the flow G5, allows the frying of raw food irrespective of the amount of water that is contained in the food.

The greasy fumes coming out from the oil mixture do not spread upwards because of the action of the depression created by the aspirator 46 in the space Z.

Since the connection between the funnel-shaped tube 13 and the just mentioned space Z is obtained through the first window 8a featured in the cover 8, the amount of greasy fumes flowing towards the funnel-shaped tube 13 is reduced to nothing because the window 8a is always under the action of the depression.

As a consequence of what has been said above said the greasy fumes do not come into contact with the raw food contained into the magazine 20, and the food itself does not become adulterated in it properties like taste, smell, color and so on.

Only the inner surface of the cover 8 and the mesh drainer 15 become soiled, but the cleaning of them is extremely easy and fast.

The feeding means 11 permits a higher number of fried portions of food between fillings of the deep-pan, as compared to the number of fried portions obtainable with the known machines where the oil mixture consumption restricts this number.

This advantage is due to the continuous feeding performed by the feeding means 11 that keep the oil mixture 9 at a constant level.

Moreover the feeding means 11 allows mounting a deep-pan that holds less than those usually mounted in such machines, this being possible because of the absence of problems due to the oil mixture consumption.

The space taken by the assembly formed by the deep-pan 6 and the cover 8 is accordingly reduced to the minimum.

The advantages resulting from the particular conformation of the separating means 32, associated with the container feeder 30, have already been pointed out in the above description.

Although the present invention has been described in terms of the presently preferred embodiment, it is to be understood that such a disclosure is not to be interpreted as limiting.

Various alterations and modifications thereof will no doubt become apparent to those skilled in the art after having read the above disclosure.

Accordingly, it is intended that the appended claims be interpreted as covering all alterations and modifications as fall within the true spirit and scope of the invention.

What is claimed is:

1. A machine for preparing a portion of fried food and immediately distributing the portion, comprising a housing; a deep-pan for containing a mixture of oils supported in said housing;

a heat source connected to said deep-pan for keeping said oil mixture at a preset temperature;

a delivery station;

a pivotable mesh drainer having a net-part and a solid part, said drainer being rotatable about a horizontal axis from a filling position, in which said net-part is immersed in said mixture in said deep-pan, to an emptying position, in which said solid part of said drainer, shaped in such a way as to convey fried food, is rotated to a position over said delivering station;

said housing defining a doorway making said delivering station accessible from outside said housing;

a magazine for raw food;

means for delivering a preset portion of raw food from said raw food magazine;

guiding means positioned within said housing to receive raw food from said delivering means and to convey said preset raw food portion to said deep-pan;

a container feeder for a pile of containers located over said delivering station, said feeder having means to part a container lowest in said pile and to direct the parted container into said delivering station;

a purifier eliminating greasy fumes from said heated oil mixture;

a first cover for said purifier;

means interconnecting said deep-pan and said purifier for conveying greasy fumes coming out from said heated oil mixture to said purifier, said purifier having means to eliminate said greasy fumes;

an electric-electronic control unit for controlling said heat source, the rotational movement of said drainer, said delivering means, said container feeder, said means for conveying said greasy fumes to said purifier, and said purifier;

a removable second cover fitted to said deep-pan;

said second cover having a first vertical window in one side of said second cover adjoining an exit of said guiding means conveying a preset portion of raw food dropping form said magazine into said drainer and a second window made in another side of said second cover adjoining said delivering station, said second window being closed by a door having an upper edge which is hinged to said second cover so that said door is able to turn outwards and upwards, when said drainer is rotated to a position over said delivering station;

said conveying means comprising an aspirating means combined with a duct;

said first cover defining a space around said purifier;

said duct being kept under depression by said aspirating means which connects to a space delimited by said cover on said purifier; and feeding means located outside said deep-pan for feeding said oil mixture and for keeping said oil mixture at a constant preset level.

2. A machine for preparing a portion of fried food and immediately distributing this portion, comprising a housing;

a deep-pan for containing a mixture of oils supported within said housing;

a heat source connected to said deep-pan for keeping said oil mixture at a preset temperature;

a delivery station positioned within said housing;

a pivotable mesh drainer having a net-part and a solid part, said drainer, being rotatable about a horizontal axis from a filling position, in which said net-part is immersed in said mixture, in said deep-pan, to an emptying position, in which said solid part of said drainer, shaped in such a way as to convey fried food, is rotated to a positioned over said delivering station;

said housing defining a doorway making said delivering station accessible from outside said housing a magazine for raw food;

means for delivering a preset portion of raw food from said raw food magazine;

guiding means positioned within said housing to receive raw food from said delivering means and raw food magazine and to convey said preset raw food portion to said deep-pan;

a container feeder for a pile of containers located over said delivering station, said feeder having means to part a container lowest in said pile and to drop the parted container into said delivering station;

a purifier for eliminating greasy fumes from said heated oil mixture;

means interconnecting said deep-pan and said purifier for conveying greasy fumes coming out from said heated oil mixture to said purifier; said purifier having means to eliminate said greasy fumes;

said means comprising a first aspirating means connected thereto;

an electric-electronic control unit for controlling said heat source, the rotational movement of said drainer, said delivering means, said container feeder, said means for conveying said greasy fumes to said purifier, and said purifier;

said purifier comprising: a first countercurrent heat exchanger having a core with an electrical heating element to receive a first air flow containing said greasy fumes through said conveying means as a result of a preset depression caused by said aspirating means, a second heat exchanger connected in series with said first exchanger for partially condensing steam generated during food frying present in said first air flow after said first flow has passed through said first heat exchanger;

a cap attached to said first heat exchanger defining a hollow space communicating with an exit of said second heat exchanger, and in which said first heat exchanger is located and having first and second openings to the outside;

a second aspirating means connected to said cap for sending a second air flow coming from outside into said hollow space, through said first opening, in order to cool the outer surface of said first exchanger and to create a third air flow by mixing said second flow coming from the outside, with said first air flow coming from said second heat exchanger;

said second openings discharging said third air flow to the outside.

3. A machine for preparing a portion of fried food and for immediately distributing this portion, comprising a housing;

a deep-pan for containing a mixture of oils supported in said housing;

a heat source connected to said deep-pan for keeping said oil mixture at a preset temperature;

a delivering station;

a mesh drainer having a net-part and a solid part, said drainer, being rotatable about a horizontal axis from a filling position, in which said net-part is immersed in said mixture in said deep-pan, to an emptying position, in which said solid part of said drainer, shaped in such a way as to convey fried food, is rotated to a position over said delivering station;

said housing defining a doorway making said delivering station accessible from outside said housing;

a magazine for raw food;

means for delivering a preset portion of raw food from said raw food magazine;

guiding means positioned within said housing to receive raw food from said delivering means and raw food magazine and convey said preset raw food portion to said deep-pan;

a container feeder located over said delivering station and supplied with a pile of containers, said feeder having means to part a lowermost container from said pile and dropping the parted container into said delivering station;

a purifier for eliminating greasy fumes from said heated oil mixture;

means for conveying greasy fumes coming out from said heated oil mixture to said purifier;

an electric-electronic control unit for controlling said heat source, the rotational movement of said drainer, said delivering means, said container feeder, said means for conveying said greasy fumes to said purifier, and said purifier;

said container feeder means comprising;

a fixed rectangular frame with two control arms respectively fixed to two opposite transverse sides of said frame;

brackets respectively fastened to opposed free ends of said control arms for positioning and laterally containing said pile;

first means for adjusting the distance between said brackets and for adjusting the position of said brackets in respect of the longitudinal axis of said frame;

a trolley having two longitudinal sheets received in support and guided by longitudinal bars forming said frame;

second means controlled by said control unit and designed for longitudinally moving said trolley according to a forward stroke and a return stroke;

two plates fitted to said related sheets and designed to receive in support corresponding parts of the border of a lowermost container of said pile when said trolley is placed in an idle position;

two longitudinal bands fastened to said trolley, each band following a related plate, with respect to said forward stroke of said trolley, and being at an upper level in respect of said related plate in order to receive in support a corresponding portion of the border of the penultimate container of said pile just before the disengagement of said lowermost container from said sheets;

two elastic strips centrally joined to said trolley and having related rear ends fastened to said trolley with an end segment of each strip extending towards a corresponding plate and located downstream of said corresponding plate, in respect of said forward stroke of said trolley, said end segment being positioned beneath, and resiliently kept in contact with, a corresponding band as a result of the articulated joint connecting a central segment of said strip to said trolley;

fixed stopping means designed to be struck by a rear segment of said strip, as a consequence of said forward stroke of said trolley and after said plates have disengaged from related portions of the border of said lowermost container of said pile, said end segments of said strips turning downwardly and parting said lowermost container from said pile.

4. The machine as claimed in claim 3, wherein said rear segment of each strip comprises a curved part extending through an arc of about 270 degrees and having an extremity turned towards a related end segment connected to said articulated joint.

5. The machine as claimed in claim 4, wherein said articulated joint comprises an elastic tail-piece having related extremities respectively joined to said trolley and to a central segment of the related strip, with said central segment adjoining, at both sides, said rear segment and said end segment respectively.

6. The machine as claimed in claim 2, including a channel having an annular cross-section, extending from a duct coming from said deep-pan, and leading to said first heat exchanger, with an internal diameter wall of said annular channel forming a pipe coming from said first heat exchanger and leading to a hollow space wrapping the larger diameter wall of said annular channel, said hollow space being connected to said second heat exchanger with said first aspirating means connected in series to said second exchanger.

7. The machine as claimed in claim 2, wherein said second heat exchanger comprises a pipe coil with a fan, said fan having the task of cooling said pipe coil by sending air on the outer surface of the pipe coil itself.

8. The machine as claimed in claim 1, including an oil mixture container attached to said housing and a pipe interconnecting said container and said deep-pan.

9. The machine as claimed in claim 2, including an oil mixture container attached to said housing and a pipe interconnecting said container and said deep-pan.

10. The machine as claimed in claim 3, including an oil mixture container attached to said housing and a pipe interconnecting said container and said deep-pan.

* * * * *